United States Patent Office 3,178,297
Patented Apr. 13, 1965

3,178,297
PROCESS FOR THE DISINFECTION OF THE SURFACE OF GRAPES AND OTHER PRUINOSE FRUITS
Philippe Serviere, 3 Cours Gambetta, Montpellier, Herault, France
No Drawing. Filed Nov. 27, 1961, Ser. No. 155,212
Claims priority, application France, Nov. 28, 1960, 845,533; Nov. 15, 1961, 878,957
8 Claims. (Cl. 99—103)

This invention is concerned with a process for disinfecting fruit and vegetables and, more particularly, the application of such process to the manufacture and stabilisation of grape juice or the juice of other pruinose fruits.

One of the main objects in fruit juice manufacture is to retain in the fruit juices the natural alimentary or organoleptic properties of the fruits from which the juices have been prepared. In this connection, there must be no fermentation of grape juices by the vinifying yeasts and the germs which are deposited on the fruit surface and taken into the juice at pressing. It has long been known how to sterilise fruit and vegetables prior to various industrial operations such as packing, cold storage or processing, for instance, into preserved fruits. For instance, fungicides, such as borax and certain phenols, protect fruits having peel, such as citrus fruits, against moulds, but such agents may damage the fruit or else cannot reliably be spread and distributed and contacted uniformly, so that their efficiency is uncertain. To obviate these disadvantages, certain surface-active agents are added which protect the fruit from being burnt by the disinfectants and increase the efficiency thereof by leading to their more uniform and more reliable distribution. With grapes, however, the conventional procedure for sterilisation, based on considerations of conventional vinification, is not to treat the actual fruit before it is converted into juice; instead, endeavors are made to inhibit fermentation in the must stage by treating the must by pasteurisation or refrigeration, by mutage with sulphur dioxide, and by carbon dioxide. These methods are expensive and lead to a change in the aroma and flavour of the juice, amongst other things. Processes have been described for sterilising grapes before pressing but are based on similar techniques and have the disadvantages just outlined.

According to this invention, yeasts and microorganisms are destroyed on the fruit before pressing, so that the natural qualities hereinbefore referred to are retained and there is no further fermentation. The process according to this invention comprises contacting the fruit with an aqueous solution of certain substances, further particulars of which are given hereinafter with regard to treatment for grapes, such solution being given a number of optimum properties, namely wetting, detergent, yeast-killing and bactericidal properties, in respect of the bloom on the fruit, the vinifying yeasts and micro-organisms.

The special substances used according to the invention to carry out the process for treating grapes and other pruinose fruits have the property of imparting to their aqueous solutions all the properties just specified, with maximum efficiency, because of the combination in a single molecule of different atom groups each responsible for one of the various properties just mentioned. The special substances according to the invention belong to a variety of well-known anionic detergents, namely, the ammonium or amine salts of mineral acid esters of fatty alcohols containing from 8 to 18 carbon atoms; in a preferred embodiment, ammonium or amine alkyl sulphates are used. It has been found, in particular, that ammonium lauryl sulphate gives very good results in the treatment of grapes by the process according to the invention.

Tests which will be described hereinafter have shown that the bactericidal action of solutions prepared from products of use according to the invention is associated, and intensified by its associations during treatment, with other actions of such solutions, such actions being of a physico-chemical nature and residing basically in a wetting, penetration, fragilisation, unsticking and partial removal of the bloom, which results in a uniform and very efficient spreading, distribution and contact of the bactericidal solution in respect of the micro-organisms and yeasts. Tests also show that the disinfecting process according to the invention does not harm the fruit and that the effect is limited solely to the bloom, to the vinifying yeasts and to the micro-organisms. The dip solution according to the invention is completely non-toxic, as the toxicity tests to be described hereinafter show, and can be removed readily and completely merely by washing the fruit in water after treatment.

The process according to this invention therefore helps to provide sterilised fruits which after pressing yield a juice which, provided it is kept away from further anaerobic contamination, cannot ferment or undergo spontaneous conversion, and the process according to the invention combines all the advantages of the prior art disinfection procedures with retention in the juice of all the natural qualities of the fruit from which the juice has been prepared. The juice thus prepared is completely free from alcohol and, because of its purity, inter alia of its exceptional organoleptic qualities, has a marked absence of the "baked" flavour distinctive of pasteurisation, the aroma depending solely upon the variety of vine used. Also, since storage is so easy, qualities can be improved by aging, and blends can be prepared in which sugar and acidity are well balanced. The compounds used for sterilisation are of reduced cost and the whole process is cheap to carry out on an industrial scale.

In tests carried out during the development of the invention, it was found that the substances selected in this process are efficient because of their outstandingly good adaptation to the conditions and mechanism of the disinfection of grapes. For instance, a grape is covered with a bloom—i.e., a non-wettable film which covers the skin and which has the classical constitution of vegetable waxes (cerotic acid, ceryl alcohols and myriceryl alcohols). The bloom retains the different substances, such as dust, stains, anti-cryptogamic products and more particularly vinifying yeasts and microorganisms which are deposited on the surface by the wind and insects or by handling. The bloom forms a water-repellant fat which by adsorption becomes associated with the water-repellant hydrocarbon part of the detergent so that the same penetrates the bloom. Once contact has been made with the microbe or yeast, the bactericidal part of the molecule, mainly the ammonium ion, comes into action. Finally, the hydrophilic polar group of the detergent or acid group is directed towards the aqueous phase and facilitates the wettitng and unsticking of the bloom and subsequent removal of the detergent and also of the bloom which is carried away by the washing water.

The complex of properties of the substances used according to the invention and hereinbefore set forth marks them out as germicidal or bactericidal detergents, a group of products which are known per se. The quaternary ammoniums are the substances which have been chiefly studied in this group but, as the following tests show, do not give satisfactory results. On the other hand, it has been found in tests that the substances used according to the invention have distinctive physicochemical actions which are essential for disinfecting grapes. The substances according to the invention are different from quaternary ammoniums, the latter being cationic surface-active agents comprising an ammonium bactericidal group which is connected to the hydrophobic carbon chain, whereas the substances used according to this invention are anionic surface-active agents in which the ammonium bactericidal group is not linked with the hydrophobic chain. However, the reason for the difference between the actions of these two groups of different products on the grape is not understood.

The following tests showed the essential physico-chemical particulars hereinbefore set forth.

A number of experiments were performed using an identical working procedure for each experiment—grapes cut off flush with the stalk were immersed for 6 hours in a 2% aqueous solution of the substances under test, then washed in water for 3 hours, then pressed, whereafter the juice was collected in sterile receptacles having their apertures blocked by a cotton pad. The ambient temperature was from 22–28° C. and the duration of each experiment was 48 hours in most cases. However, experiments were continued for up to 20 days where there was no fermentation of the juice after 48 hours.

The following examinations were made after treatment:

Whether or not the juice had fermented was determined by the evolution of gas, and the yeasts and micro-organisms were looked for in the juice. The surface tension of the washing water and of the juice was measured to ensure that the sterilising products had definitely been dissolved in the washing water and were not in the juice. A histological examination was made of the fruit to show the behaviour of the bloom. Finally, tests of acute and semi-chronic toxicity in rats were made using the solutions according to the invention. These examinations are described with very full particulars in the particular example of ammonium lauryl sulphate.

Five groups of products were tested consecutively:
(1) Various alkyl sulphate salts, alone or in admixture;
(2) Quaternary ammonium;
(3) Wetting and detergent antiseptics;
(4) Ordinary antiseptics;
(5) Mixtures containing a surface-active compound and an antiseptic.

The details and results of the tests and examinations are given in the following tables:

TABLE I

*Alkyl sulphates, alone or in admixture*

| Compound for sterilisation of grape | Observations |
| --- | --- |
| 2% aqueous solution of sodium lauryl sulphate. | Fermentation with evolution of gas in 48 hours. |
| 2% aqueous solution of sodium lauryl sulphate+thorium+neodymium (laurylated neothorium). | Do. |
| 2% aqueous solution of the sodium salt of lauryl sulphate+hydroxyquinoline+salicylic, acetic and tartaric acids+sodium propionate (known commercially as Dermacide). | Do. |
| 10% aqueous solution of sodium lauryl sulphate+chloromercuric dibutylphenol+ether (commercial name: Laurylated mercryl). | Do. |
| Sulphonated lauric alcohol neutralised with triethanolamine in— | |
| 2% solution | (a) No fermentation visible in 15 days. |
| 1% solution | (b) Examination under microscope; absence of yeast. (c) Re-seeding—absence of fermentation in 10 days. (d) Examination under microscope; absence of yeast. |
| Ammonium lauryl sulphate, in 2% aqueous solution in 1% solution. | No fermentation at the end of 7 full days (see the other tests in the following part of the description). |

TABLE II

*Mixtures of antiseptics and surface-active agents*

| Grape-sterilising compounds tested | Observations |
| --- | --- |
| Equal quantities of sodium benzoate + sodium lauryl sulphonate. | Inactive. |
| Mercurochrome + sulphonated fatty alcohols. | Do. |
| Mercury phenyl borate + surface-active wetting agent. | Do. |
| Lacto-serum + lactic acid and phosphoric acid + hyperfatty vehicle (commercially known as Lactacyd, liquid): | |
| (a) 2% concentration | No fermentation in a fortnight (but fermentation on 20th day). Examination under microscope reveals the presence of stationary yeasts with apparently intact cores. |
| (b) 1% concentration | Fermentation with evolution of gas in 48 hours. |
| 4,4'-diamidino-1,6-diphenoxyhexane di-isothionate in solution in a wetting and detergent vehicle (commercially known as Hexomedine) in a 1% aqueous solution. | Fermentation in 48 hours with evolution of gas. |
| For other examples, see all the alkyl sulphates in mixtures in Table I. | Fermentation with evolution of gas in 48 hours. |

Apart from the previous examples, many substances used in various disinfecting processes combine with the fruit skin and modify the same and therefore cannot be washed off. This occurs with N/10 ammonia, sulphur dioxide and sodium hypochlorite and with a wetting and detergent antiseptic association of phenyloxybenzonate-isopropyl-meta-cresol, commercially known as "Paragerm." Ammonium lauryl sulphate is found to be the most efficient of the foregoing tested compounds for grape disinfection. The part played by the bactericidal ammonium ion of the anionic detergent in grape sterilisation is emphasised by the fact that the sodium analogue, sodium lauryl sulphate, is inactive in the test conditions. In the experiments another compound still further emphasises the part played by the bactericidal ammonium ion in grape sterilisation—triethanolamine lauryl sulphate. In this compound the alkyl chain and the polar group are the same as in ammonium lauryl sulphate but the ammonium cation has been modified, being derived from an amine instead of from ammonia. The amine derivative is yeasticidal in the conditions of the experiment. During a first test it was not all removed by washing in running water and some was found in the juice, but a less soluble product of this kind could be used in practice if an appropriate washing time is given, for instance, by measuring the surface tension of the washing water. None of the other products tested gave a satisfactory result.

A description will now be given of the experiments made more particularly in respect of ammonium lauryl sulphate, showing the excellent results achieved with this compound in sterilising grapes in the process according to this invention.

First, the following fermentation tests were made with grape juice obtained from grapes treated with an aqueous solution of ammonium lauryl sulphate in accordance with the invention.

A flask containing 100 cc. of grape juice was placed in a water bath having a constant temperature of 25±0.5° C. A check for signs of possible fermentation was made for a week (seven complete days); at no time was any evolution of gas nor change of smell observed. It was apparent, therefore, that the product had not fermented in these conditions. To the 100 cc. of juice in the flask were then added 2 cc. of fresh grape juice in full fermentation and the flask was then returned to the constant-temperature bath. The following day there was considerable evolution of gas which continued for the following two days, the time of the observation. It follows that the treated grape juice examined does not ferment spontaneously, but the treatment which it has been given does not prevent further fermentation by an addition of fresh active yeasts.

The following bacteriological investigations were also made.

Aerobic and anaerobic cultures of a grape juice prepared by the process according to the invention showed the presence of saprophytic bacteria of the chromobacter kind (Serratia and Flavobacterium). There was an absence of yeasts, in particular of vinifying yeasts, and of pathogenic bacteria, whereas the study of an untreated juice prepared like the previous one showed vinic fermentation yeasts fermenting. The sterilising agent used according to the invention was studied as follows.

(a) Study by diffusion on a solid medium, by means of sterilising agent-impregnated filter paper discs: An action was noted, more particularly on the pathogenic staphylococci and on the vinifying yeasts.

(b) Study by culture of germs in a liquid medium, in tubes containing decreasing doses of sterilising agent: This study showed that the product is active on pathogenic staphylococci at a dilution in the culture medium of 1/5120 and on the yeasts already studied at a dilution of 1/540.

(c) Contact-time study: With the sterilising agent at a dilution of 1/200, the time required to kill all the germs of a culture was studied by planting-out on a solid medium at regular intervals. This time was 2 hours for the staphylococci and for the yeasts.

A grape juice prepared by the method according to the invention and with the sterilising agent studied was tested to see if residues of sterilising agent could be detected by its bactericidal activity.

(a) The fruit juice, seeded with a yeast, fermented, apparently without anything inhibiting the development of the yeast.

(b) The fruit juice added to culture media at concentrations of from 1/1000 to 1/10 did not inhibit the development of staphylococci nor of yeasts.

(c) The fruit juice absorbed on a filter paper disc did not produce any inhibition zone in respect of such germs by culture on a solid medium in a Petri dish.

The sterilising agent used is therefore active against yeasts and pathogenic staphylococci under certain conditions of concentration and contact time. The process according to the invention helps to remove yeasts from fruit juices and thus to inhibit fermentation thereof. The resultant juice does not contain sterilising agent in doses which can be detected by bactericidal activity. Surface tension measurements were then made to check that the ammonium lauryl sulphate is actually dissolved when the fruit is washed with water and that there is no chance of its presence in the juice which is yielded in a pure state.

The addition of the sterilising agent to water to give a concentration of $10^{-4}$ caused the surface tension of the water to be reduced from 73 to 49 dynes at 20° C. Also, the surface tension of the washing water of the treated grapes (20 minutes' washing time) was of the order of 70 dynes. When the surface tension of the natural and treated grape juice was measured, no appreciable difference was found between the surface tensions of the respective grape juices. However, if the product was added to the untreated juice to give a concentration of $10^{-4}$, the surface tension was lowered by approximately 10%.

From the various tests made, it may be deduced that the concentration of sterilising agent in the juice after the washing treatment is less than 1 part in a million.

Histological examinations were also made to show how the bloom of the grape skin behaves when treated by the process according to the invention using ammonium lauryl sulphate as sterilising agent.

The following three experiments were accordingly carried out:

(1) A large number of histological fixation techniques and different stainings of the lipins (fixation, inclusion in paraffin, cuts and stainings), and the technique of frozen cuts followed either with a Baume mounting or with a glycerine mounting after the action of different colouring agents for the lipins (no special wax techniques) did not give tangible results.

(2) A technique was then used of cuts with mounting without staining in glycerine and microphotographs were taken.

This technique gave the following results:

(A) The cuts of the control grapes have an abundant bloom in the form of refringent rods or grains pressed tightly together and irregularly distributed over the surface of the skin.

(B) After treatment by the process according to the invention, the bloom is much more scattered and has apparently been largely destroyed.

(3) The controls and the treated grapes are covered with a thin cellulose film which is removed after drying and which is examined directly under a microscope without any preparation.

(A) The film of the controls shows just a few rare zones of bloom, all the rest being substantially empty except for odd grains or rods scattered in the microscope field.

(B) The film of the treated articles shows a bloom having a density substantially equal to the density of case B of paragraph (2), so that the following conclusions can be drawn:

The product used removes an appreciable amount of the bloom, and experiment (3) shows that the very dense bloom of the controls is not fixed and removed by the cellulose film, whereas the bloom of the treated products is removed together with the cellulose film since such bloom has been wetted and fragilised by the treatment.

Toxicity tests with an aqueous solution of ammonium lauryl sulphate were then made.

(a) ACUTE TOXICITY TESTS

The solution was administered by gastric probe to adult male rats weighing from 150 to 250 g. The rats were divided into four batches of 5 animals which were dosed as follows:

Batch 1: pure product (1 cc. by probe)
Batch 2: 50% aqueous solution of product (1 cc. of solution)
Batch 3: 25% aqueous solution of product (1 cc. of solution)
Batch 4: 10% aqueous solution of product (1 cc. of solution)

The solution was given once a day for five days. All the rats survived the treatment and no macroscopic anomaly is found on autopsy. It can therefore be concluded that, when administered in the conditions hereinbefore given, the product used in the process according to the invention does not manifest any evident toxicity.

(b) SEMI-CHRONIC TOXICITY TESTS

The product was diluted with distilled water to yield a 50% solution and a 10% solution. Three batches of rats were formed with animals of Wistar stock weighing from 110 to 130 g.; each batch consisted of five animals. All the animals were given the same food (a complete food for rats+a little green stuff) and were placed in the same living conditions. .1 cc. of the solution under test was given to each animal daily for 40 days by gastric intubation.

Batch I: Aqueous saline solution containing 9 parts of salt per 1000 parts of water (control)
Batch II: 50% aqueous solution (P)
Batch III: 10% aqueous solution (P)

The mean weight of each batch was determined on the first, twentieth and fortieth days and increased regularly during treatment but there is no significant difference between the various batches. Autopsy on the fortieth day did not show any macroscopically visible lesion; more particularly there are no signs of hepatic steatosis or of intolerance in any of the treated animals. No death was recorded during treatment and autopsy revealed no anomaly. At the dosage used, therefore, the product is apparently not likely to have semi-chronic toxicity. The series of tests made with ammonium lauryl sulphate, details of which are given hereinafter, show that the grape juice prepared by the process according to the invention does not ferment at the end of seven complete days (fermentation tests). The product does not enter the juice and is completely eliminated by the washing waters (surface tension measurements). Ammonium lauryl sulphate is active in the treatment of grapes at a 1% concentration; it is active in vitro on vine yeasts and on the pathogenic staphylococci in a 0.5% concentration in 2 hours. Similar considerations apply to triethanolamine lauryl sulphate. The product has the effects previously described on the bloom (histological examinations). These latter physico-chemical actions which have been previously referred to herein seem, in relation to the surface-active power of the compound (49 dynes at a concentration of 0.1%) and its wetting power sufficiently evaluated on a Dognon-Abribat extensometer. The effective contact time of 2 hours in the tests in vitro previously referred to is for the case of treatment of the grapes for 8 hours to allow a sufficient margin for wetting and unsticking the bloom.

A description will now be given by way of example of how fruit juice can be manufactured and stabilised by the process according to the invention. The example is given solely by way of explanation and is not limitative, and many modifications can, of course, be made without departing from the scope of the invention.

The technique of manufacturing and stabilising grape juice comprises a number of stages—picking the fruit, destruction of the micro-organisms, washing the fruit, pressing and conservation. For picking, the same conditions apply as for picking table grapes; they must be harvested before becoming excessively ripe, the bunches must not be crushed, they must be transported without heaping in wide baskets, withered or open grapes must be sorted out, and complex bunches divided. Yeasts and micro-organisms on the fruit are destroyed before pressing by the bunches being immersed in the solution according to the invention.

To this end, an 0.5% aqueous solution of ammonium lauryl sulphate, with 8 hours contact time, is preferably used. In the experimental cultures the yeasts and micro-organisms (including the highly resistant pathogenic staphylococcus) are destroyed in two hours. This contact time must be increased fourfold to give a sufficient margin, allowing for wetting and unsticking of the bloom. The treated fruit is washed in water in which the alkyl sulphate is readily soluble. After washing in a spray to remove the foam, the grapes are immersed in a bath of running water from 3 to 5 hours, the time varying with the rate of flow and the movement of the water. It is not essential to use a sterile water but a drinkable water must be used.

There is nothing special about pressing; it is only necessary to act quickly to prevent oxidation of the juice. Treading, stalking and pressing are performed as for white vinification, but the grapes are first drained or, and preferably, dried in hot air, for hot air drying bursts the skin cells and helps to release the anthocyans which are an important factor in aroma and colouring.

The resultant juice cannot ferment spontaneously and it can be stored by keeping it away from any chance of recontamination by the yeasts and micro-organisms and by destroying the saprophytic flora which is supplied by the washing water and which occurs during pressing. To prevent recontamination wetting must be performed outside a vinifying cellar, and the sorting and bunch-preparing steps must be separated from the following steps. Final stabilisation is achieved by removing the saprophytic flora by anaerobic storage. Hermetically sealed tanks are used for this, from a simple carboy to steel fruit juice tanks and to a closed vat with greasing of the openings. The vessels must be completely filled to obviate a large layer of air at the top.

The sterilising process according to the invention, in addition to being of use in the manufacture and stabilisation of grape juice, can also be used to sterilise a variety of pruinose fruits and pruinose vegetables, such as cabbages or the like, to store them before further treatment such as their conversion into juices or preserved fruits, packing and canning.

The grape juice prepared according to the invention can be given delayed fermentation treatment by a subsequent addition of fresh active yeasts. If required, the pulp can be separated from the juice by centrifuging to give a clear juice or for use on its own, for instance, in the preparation of cosmetic creams.

I claim:

1. Method of disinfecting the surface of whole pruinose fruits and vegetables which comprises immersing said surface for a period of about 2 to 8 hours in an aqueous solution of a member selected from the group consisting of the ammonium salt of a mineral acid ester of a fatty alcohol having about 8 to 18 carbon atoms and the acid addition salt of said mineral acid ester with triethanolamine, said member being present in a concentration of about 1 to 2% by weight; and then rinsing the aforesaid pruinose fruits and vegetables in running water for 3 to 5 hours.

2. Method in accordance with claim 1 wherein the member is the ammonium salt of an alkyl sulfate.

3. Method in accordance with claim 1 wherein the member is the triethanolamine addition salt of an alkyl sulfate.

4. Method in accordance with claim 1 wherein the member is the ammonium salt of lauryl sulfate.

5. Method in accordance with claim 1 wherein the member is the triethanolamine addition salt of lauryl sulfate.

6. Method in accordance with claim 2 wherein the fruit is grapes.

7. Method in accordance with claim 3 wherein the fruit is grapes.

8. Method of disinfecting the surface of whole grapes which comprises immersing the grapes for a period of about 2 to 8 hours in an aqueous solution of ammonium lauryl sulfate, the sulfate being present in a concentration of about 1 to 2% by weight; and then rinsing the grapes in running water for 3 to 5 hours.

References Cited by the Examiner

UNITED STATES PATENTS

| 2,890,120 | 6/59 | Makower | 99—154 |
|---|---|---|---|
| 2,903,372 | 9/59 | Walker | 99—155 X |

FOREIGN PATENTS

| 7/26 | 4/27 | Australia. |
|---|---|---|

OTHER REFERENCES

Surface Active Agents and Detergents, by Schwartz, Perry and Berch, vol. II, 1958, page 228.

Surface Active Agents and Detergents, by Schwartz, Perry and Berch, vol. II, 1958, page 552.

A. LOUIS MONACELL, *Primary Examiner.*

TOBIAS E. LEVOW, *Examiner.*